United States Patent [19]

Moser

[11] Patent Number: 5,742,450
[45] Date of Patent: Apr. 21, 1998

[54] DISK DRIVE SPINDLE MOTOR WITH RADIAL GAP AND FIELD GENERATING COILS INTERCONNECTED BY RING FLUX GUIDE

[75] Inventor: Michael Anthony Moser, San Jose, Calif.

[73] Assignee: International Business Machines Corporation, Armonk, N.Y.

[21] Appl. No.: 400,645

[22] Filed: Mar. 8, 1995

[51] Int. Cl.$^6$ .............................. G11B 19/20; H02K 7/14; H07K 1/12
[52] U.S. Cl. .................... 360/99.08; 310/67 R; 310/254; 369/266
[58] Field of Search ................ 360/99.08, 98.07, 360/99.04; 310/67 R, 254; 369/258, 266

[56] References Cited

U.S. PATENT DOCUMENTS

| | | | |
|---|---|---|---|
| 2,986,684 | 5/1961 | Cluwen | 318/138 |
| 3,124,733 | 3/1964 | Andrews | 318/138 |
| 4,837,474 | 6/1989 | Petersen et al. | 310/254 |
| 4,841,393 | 6/1989 | MacLeod et al. | 360/98.07 |
| 4,949,000 | 8/1990 | Petersen | 310/179 |
| 5,195,002 | 3/1993 | Sakurai | 360/99.08 |
| 5,257,151 | 10/1993 | Cooper et al. | 360/98.07 |
| 5,296,981 | 3/1994 | Ogawa | 360/99.08 |
| 5,298,825 | 3/1994 | Oudet et al. | 310/156 |
| 5,352,947 | 10/1994 | MacLeod | 310/67 R |
| 5,412,522 | 5/1995 | Lockhart et al. | 360/99.08 |
| 5,502,605 | 3/1996 | Myokan | 360/99.08 |
| 5,519,270 | 5/1996 | Yamada et al. | 360/98.07 |

FOREIGN PATENT DOCUMENTS 07-230663  8/1995  Japan.

*Primary Examiner*—Craig A. Renner
*Attorney, Agent, or Firm*—Thomas R. Berthold

[57] ABSTRACT

A brushless permanent magnet DC motor for use as a disk drive spindle motor has a radial working gap but uses flat coils that generate magnetic fields that interact with the permanent magnet fields across the radial gap. The stator includes a plurality of angularly spaced stator teeth that have faces radially spaced across the gap from the permanent magnet. The magnetic flux from the permanent magnet is directed radially across the gap and into the stator teeth. Each stator tooth has an axially oriented post around which is wound a flat coil that generates an axial field. The central axis of the coil forms part of the magnetic circuit. The magnetic flux directed radially into each stator tooth is turned axially into the post. The axially directed magnetic flux through the coil and post on each tooth is redirected from the axial direction to the circumferential direction by a ring magnetic flux guide. The ring flux guide interconnects the stator teeth and forms part of the magnetic circuit.

9 Claims, 6 Drawing Sheets

5,742,450

DISK DRIVE SPINDLE MOTOR WITH RADIAL GAP AND FIELD GENERATING COILS INTERCONNECTED BY RING FLUX GUIDE

TECHNICAL FIELD

This invention relates to brushless permanent magnet direct current DC motors, such as those used as spindle motors in data recording disk drives.

BACKGROUND OF THE INVENTION

Permanent magnet direct current (DC) motors are in wide use in applications that require moderate torque within a small volume. The torque is generated by the interaction of two magnetic fields: a fixed magnitude one generated by a set of permanent magnets, and a variable amplitude one generated by a set of electromagnet coil windings. A high magnetic permeability material, such as electrical iron, is used to direct the magnetic flux to produce the largest possible interaction between the two fields. In brushless permanent magnet DC motors, the coil windings form part of the stator and remain stationary, and the permanent magnets form part of the rotor and rotate. The permanent magnets are arranged with alternating polarity, and as the rotor spins, the current in the coil windings is switched to produce the desired torque.

Brushless permanent magnet DC motors are used as disk drive spindle motors in small magnetic recording disk drives. The permanent magnet is typically a ring magnet that generates a magnetic field in a radial direction across a radial gap. The coils are wound around radially oriented stator teeth and produce radially directed magnetic fields across the radial gap. An example of a disk drive with a radial-gap spindle motor is described in U.S. Pat. No. 5,352,947. The advantage of a radial-gap spindle motor is that it produces only small radial forces and no axial forces on the motor bearing assembly. The primary disadvantages are the relatively large axial spacing occupied by the coils and the difficulty in winding the coils. Also, because the coils are wound around the stator teeth, there must be some minimum angular spacing of the stator teeth near the working gap to allow for insertion of a coil winding guide to fit between the stator teeth.

To address these disadvantages, brushless permanent magnet DC motors have been proposed that use a stator with flat coils wound around axially oriented stator teeth and a rotor with flat plate permanent magnets that generate magnetic fields across an axial gap. Examples of disk drives with axial-gap spindle motors are described in U.S. Pat. Nos. 4,841,393 and 5,195,002. The flat coils are substantially easier to manufacture but the location of the permanent magnets still contributes to the overall axial thickness of the motor. Also, axial-gap motors generate axial forces on the motor bearings that contribute to bearing wear.

What is needed is a disk drive radial-gap spindle motor with minimal axial thickness that does not generate axial forces on the bearing assembly and is easy to manufacture.

SUMMARY OF THE INVENTION

The invention is a brushless permanent magnet DC motor that has a radial working gap but uses flat coils that generate magnetic fields that interact with the permanent magnet fields across the radial gap. The stator includes a plurality of angularly spaced stator teeth that have faces radially spaced across the gap from the permanent magnet. The magnetic flux from the permanent magnet is directed radially across the gap and into the stator teeth. Each stator tooth has an axially oriented post around which is wound a flat coil that generates an axial field. The central axis of the coil forms part of the magnetic circuit. The magnetic flux directed radially into each stator tooth is turned axially into the post. The axially directed magnetic flux through the coil and post on each tooth is redirected from the axial direction to the circumferential direction by a ring magnetic flux guide. The ring flux guide interconnects the stator teeth and forms part of the magnetic circuit.

For a fuller understanding of the nature and advantages of the present invention, reference should be made to the following detailed description taken together with the accompanying drawings.

DESCRIPTION OF THE PREFERRED EMBODIMENT

Figure 1:
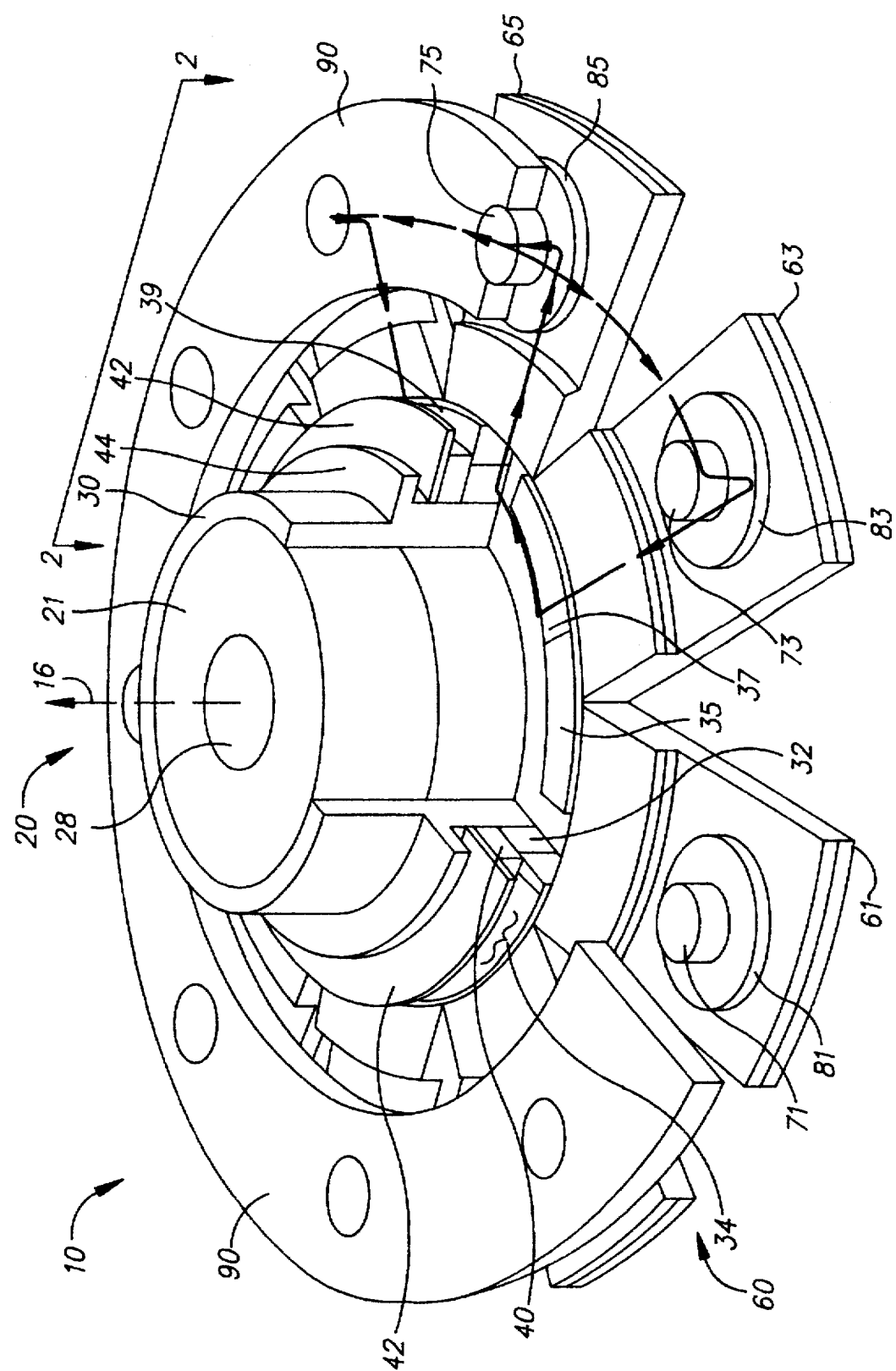
FIG. 1 is an isometric view of the motor of the present invention with a portion of the rotor cut away to illustrate the stator.
Figure 2:
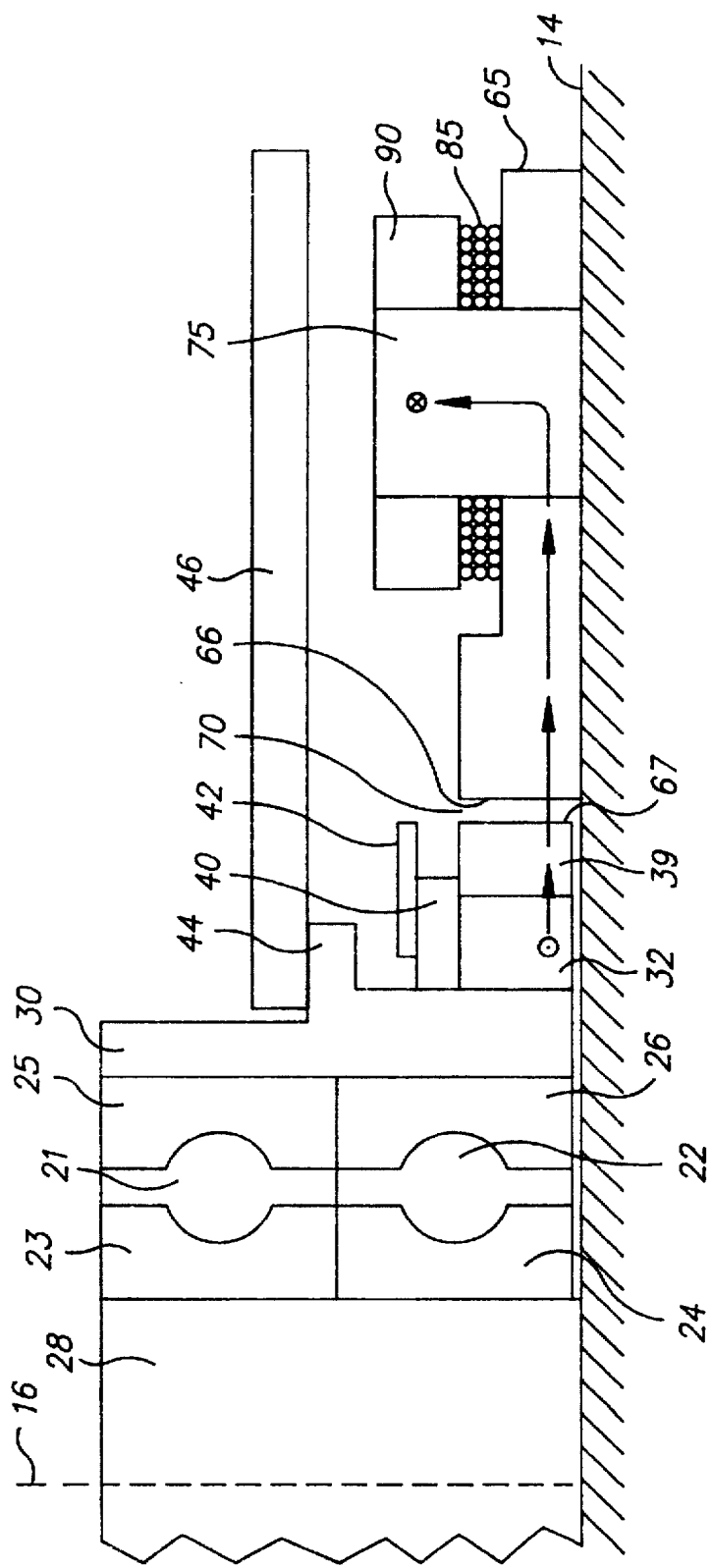
FIG. 2 is a sectional view of Section 2—2 of FIG. 1.

The brushless permanent magnet DC motor 10 according to the present invention is shown in the partial cutaway isometric view of FIG. 1 and the sectional view of FIG. 2, which is section 2—2 from FIG. 1. The motor 10 includes a rotor 20 that is mounted to base 14 (FIG. 2) and rotates about a central rotational axis 16, and a stator 60 also mounted to base 14. Stator 60 is circumferentially spaced around central rotational axis 16 of the rotor 20.

The rotor 20 includes a bearing assembly of upper and lower bearings 21, 22, each of which has inner races 23, 24 and outer races 25, 26, respectively (FIG. 2). The inner races 23, 24 are secured to a fixed shaft 28 that is secured to and axially extends from base 14. Shaft 28 has a central axis collinear with the central rotational axis 16 of rotor 20. A cylindrical sleeve 30 is attached to the outer races 25, 26. An annular backing rim 32 is attached to and located radially outwardly from cylindrical sleeve 30. Backing rim 32 is preferably formed of a high-permeability, soft magnetic material, such as electrical iron or low-carbon steel, and is properly heat treated to obtain a high saturation magnetic flux density, typically above 14,000 Gauss.

An annular ring permanent magnet 34 is attached to and located radially outwardly from backing rim 32. Ring magnet 34 is a conventional type of magnet used in radial-gap brushless DC motors and has a plurality of angularly-spaced magnet segments with alternating magnetic polarities. The segments can be either discrete magnets or magnetically separate but physically continuous portions of a single-piece ring. Adjacent magnet segments 35, 37, 39 are shown in FIG. 1. The backing rim 32 located between sleeve 30 and ring magnet 34 provides a magnetic flux return path for the segments of ring magnet 34. The magnet 34 is preferably made of a ring of high-moment magnetic material such as neodymium-iron-boron or samarium-cobalt. The remanent magnetic field induced in the ring magnet 34 during its fabrication results in multiple magnetic poles. The result is a ring magnet with a magnetic field that alternately points radially outwardly and inwardly around the ring. In the embodiment shown in the figures, the ring magnet 34 has eight individual poles associated with the angularly-spaced magnet segments. However, it is well known in the design of brushless permanent magnet DC motors that different numbers of magnet segments and stator teeth can be selected. For example, the motor can have twelve magnet segments instead of eight, in which case the motor would have a more even torque distribution, i.e., less torque ripple, but potentially more cogging torque.

An annular magnetic shield 42 and spacer layer 40 are also attached to the sleeve 30. The spacer layer 40 is formed of any suitable nonmagnetic material. The sleeve 30 includes a lip 44 that is used to support a data recording disk, such as magnetic recording disk 46 shown in FIG. 2. The magnetic shield 42 is made of the same soft magnetic material as backing rim 32 and prevents any stray magnetic flux from magnet 34 from reaching the magnetic recording disk 46. The shield 42 is not required if the data disk is an optical disk.

The stator assembly 60 includes a plurality of circumferentially-spaced stator elements or teeth attached to base 14. There are nine equally angularly-spaced stator elements in the embodiment shown in FIG. 1, including adjacent typical stator teeth 61, 63, 65. Each stator tooth, such as typical stator tooth 65, also shown in FIG. 2, has a face 66 that faces the radially outer surface 67 of magnet segment 39 of ring magnet 34 to define a radial working gap 70. As shown by typical stator teeth 61, 63, 65 in FIG. 1, adjacent stator teeth have their respective faces closely aligned circumferentially with each other. Stator tooth 65 is typical of the stator teeth shown in FIG. 1. Stator tooth 65 is axially stepped in thickness so that the radially outer portion has a smaller axial thickness than the radially inner portion that has face 66. This stepping can be accomplished through a stamping process or by making the stator teeth from two components that are attached by use of an adhesive or other fastening technique. The individual stator teeth are attached to base 14 with an adhesive or other fastening technique. As best illustrated in FIG. 1, the axial thickness of the ring magnet 34 is substantially the same as the axial thickness of stator tooth 65 in the region of the gap 70. While the thicknesses need not be the same, the center lines should be axially aligned between the magnet and the stator teeth so that there are minimal axial magnetic forces acting on the rotor 20.

An axially extending post and an electrically conductive coil wrapped about the post are located on each stator tooth. As shown in FIG. 1, adjacent stator teeth 61, 63, 65 have axial posts 71, 73, 75 and corresponding coils 81, 83, 85. As shown in FIG. 2, coil 85 is preferably a flat wound coil wrapped around post 75. A flat wound coil is one where the coil is wrapped in a spiral generally in a plane. Each layer in the spiral can be made up of multiple side-by-side wires, or the flat wound coil can be made up of a stack of flat spirals which are alternately inwardly and outwardly wound. Three stacked layers of the flat wound coil are shown in FIG. 2. The coils create electromagnetic fields that interact with the permanent magnet field to produce torque in the motor. The coils are formed by winding insulated conductors of low resistivity material such as copper, aluminum or silver. The axial thickness of the portion of stator tooth 65 and coil 85 is less than the axial thickness of magnet 34, thereby minimizing the overall axial dimension of the spindle motor 10. When electrical current is applied to each of the coils, a magnetic field is induced that is in the axial direction and generally aligned with the central axis of the cylindrical post 75.

A major advantage of the motor over conventional radial-gap motors lies in the close circumferential spacing of the stator teeth near the working gap 70. Since there are no conventional coils for generating radial fields across the radial gap, there is no requirement of a minimum circumferential spacing between adjacent stator teeth to allow for insertion of a coil winding guide. Thus, the edges of adjacent stator teeth at the working gap 70 can be arbitrarily close together, leading to a reduction in the cogging torque of the motor. This close circumferential spacing between stator teeth 61 and 63 near the gap 70 is shown in FIG. 1. However, as is known in the art, the stator teeth should be shaped away from these edges to reduce the parasitic flux losses and inductance increase in the motor caused by this additional flux path.

A ring magnetic flux guide 90 interconnects each of the stator teeth. The flux guide 90 and the posts, such as typical post 75, are also formed of soft magnetically permeable material such as electrical iron or low-carbon steel. The ring 90 provides a path for magnetic flux, including the magnetic flux induced by each of the coils, between the adjacent posts. The ring 90 redirects the axially-directed flux from the coils to a circumferential direction around the stator and between adjacent stator teeth.

The operation of the spindle motor 10 as thus described can be better understood by considering the path of the magnetic circuit within the rotor and stator portions. In FIGS. 1 and 2, the magnetic circuit is indicated by arrows, with directional components out of the figure being depicted by a circled x and components into the figure being depicted by a circled dot. Referring first to FIG. 2 and beginning at the permanent ring magnet 34 at the radially outer surface 67 that faces gap 70, the magnetic circuit passes in a radial direction across gap 70 through stator tooth 65 to post 75. The flux path then turns axially upward through post 75. Referring next to FIG. 1, the flux path is then split into two portions as it is turned circumferentially through ring flux guide 90. Referring to the portion directed to adjacent stator tooth 63, the flux path is circumferential until it reaches post 73. It then turns axially downward through post 73 (and the center of coil 83), then radially inwardly through stator tooth 63 to the gap 70 between stator tooth 63 and the outer face 67 of the ring magnet 34 (magnet segment 35). The flux path is then radially through the magnet segment 35, and back into the backing rim 32. The backing rim 32 provides a circumferential return path for the flux back to the portion of rim 32 behind magnet segment 37. From there the flux path is radially back through magnet segment 37 to the face 67, from where it began (FIG. 2). If there is current flowing through any of the coils, it serves to either increase or decrease the net magnetic flux flowing axially through the posts. With this magnetic circuit the spindle motor 10 combines the advantages of a radial gap motor with the advantage of flat coils that generate axial fields. The ring magnetic flux guide then redirects the axial fields from the coils circumferentially, after which they are directed radially by the stator teeth to the working gap.

Figure 3:
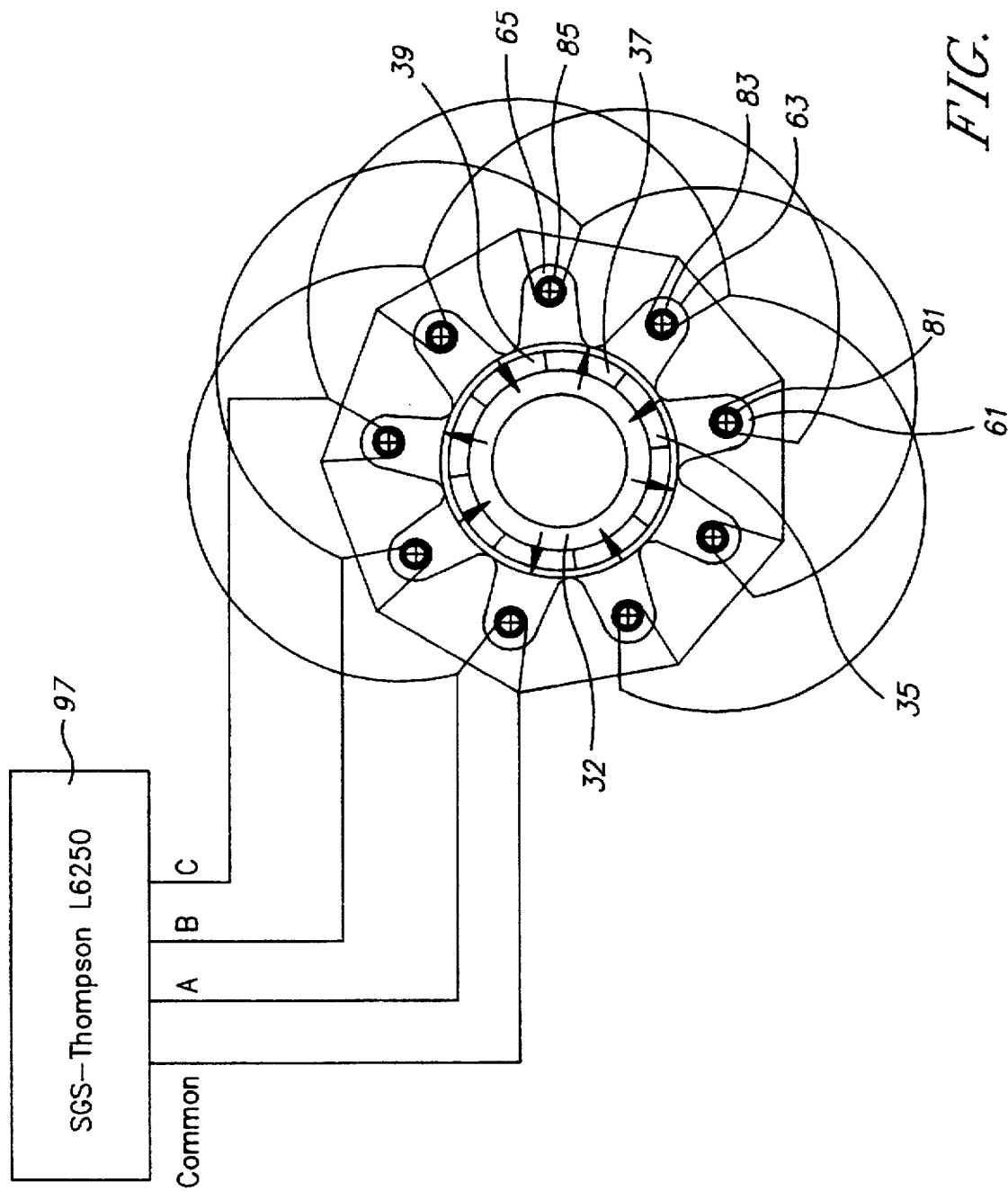
FIG. 3 is a block diagram of the electrical connection of the coils to the motor control circuitry.

FIG. 3 is a diagram showing the wiring connection to the individual flat wound coils on each of the stator teeth and attachment to conventional electrical commutation circuitry, such as SGS-Thompson L6250 disk drive spindle motor and voice coil motor (VCM) power and control chip module 97. As is well known the coils are connected in groups called phases. The connection scheme shown in FIG. 3 is the conventional Y pattern with the coils connected in parallel. The coils could also be connected in the conventional Delta pattern. The coils in a phase can be connected either in series or parallel. The use of the flat wound coils that generate axial fields, in combination with a radial gap as shown and described, allows for a large volume of electrical conductors to be placed in a flat geometry, resulting in a thin motor with moderate torque.

While not shown in FIG. 3, an alternative coil construction is one where all the coils are formed on a single conventional flex cable having holes for registration with the posts or bosses on the stator teeth, with the cable being connected to chip module 97. In this embodiment, each coil is a patterned spiral coil formed on the flexible substrate. This technique improves manufacturability of the motor.

Figure 4:
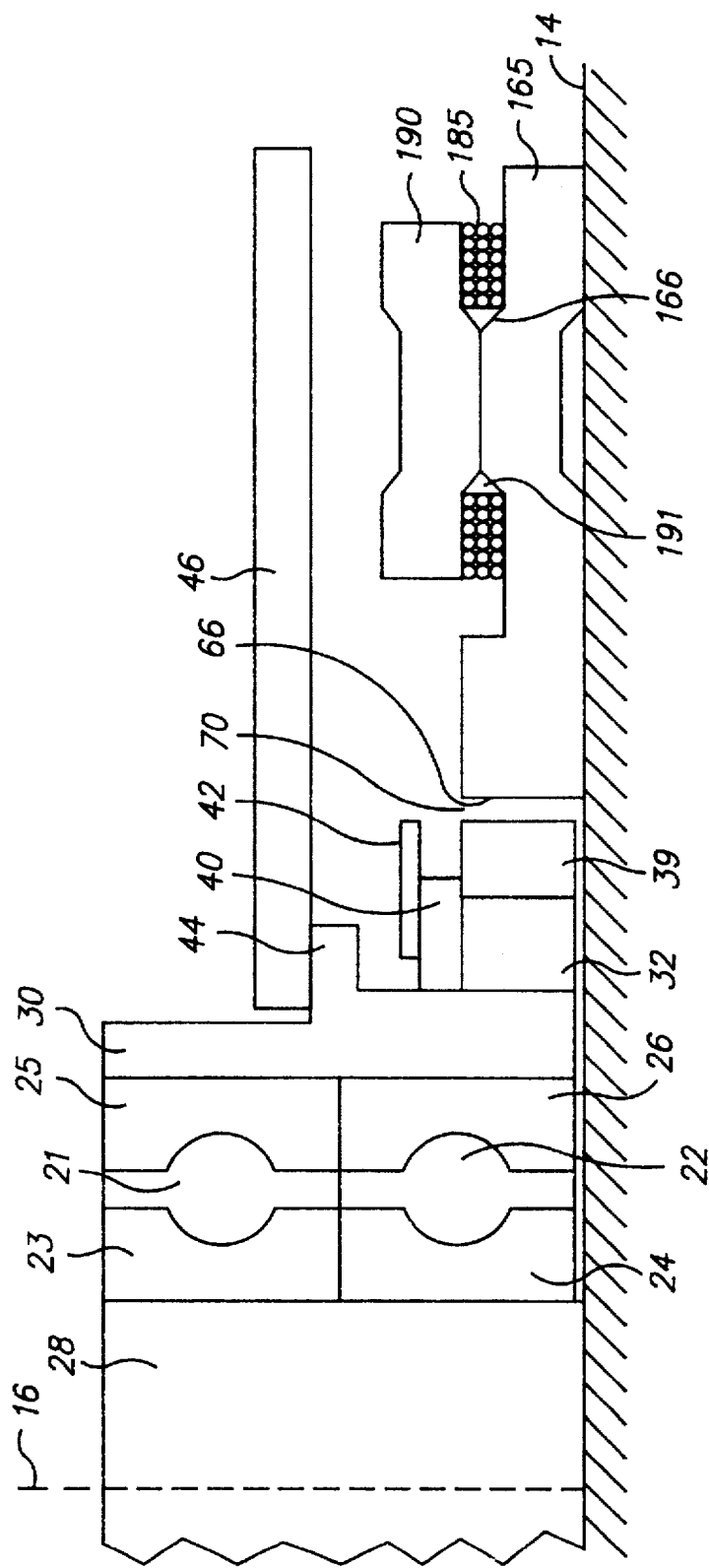
FIG. 4 is a sectional view of a portion of an alternative embodiment of the motor showing an alternative ring flux guide.

FIG. 4 shows an alternative embodiment of the present invention with a view analogous to the sectional view of FIG. 2. In the embodiment of FIG. 4, the discrete posts located on the stator teeth are not used. Instead, the stator teeth have axially extending bosses, as shown by the axially extending boss 166 on stator tooth 165. The ring magnetic flux guide 190 has a plurality of angularly spaced bosses, such as typical boss 191, that are spaced to align with corresponding bosses on each of the stator teeth, such as boss 166 on typical stator element 165. The ring 191 is thus attached to each of the stator teeth, thereby eliminating the need for the posts. The bosses on the stator teeth and ring flux guide are formed by stamping or machining. The coil 185 is located in the axial space defined between the stator tooth 165 and the ring 190. The thickness of that axial space is defined by the thicknesses of the two respective bosses 166, 191. The operation of the alternative embodiment of the spindle motor is identical to that described with respect to FIGS. 1 and 2. In both embodiments the ring flux guide is physically connected to the stator teeth so that there is a path to allow axially-directed magnetic flux from the flat coils to travel circumferentially to adjacent stator teeth, and then ultimately radially to the working gap. It is to be understood that the discrete posts or bosses are shown as the preferred means to provide magnetic flux connection by way of actual mechanical connection between the stator teeth and the ring flux guide. However, the important aspect of the ring flux guide is that it merely be in sufficiently close proximity to the stator teeth to provide a magnetic flux connection. As long as any gap between the ring flux guide and the stator teeth is significantly smaller than the working gap, or there is actual mechanical connection, and the coils are located somewhere within this region to provide the axially directed fields, the ring flux guide will form part of the magnetic circuit and redirect the axial fields in the circumferential direction.

Figure 5:
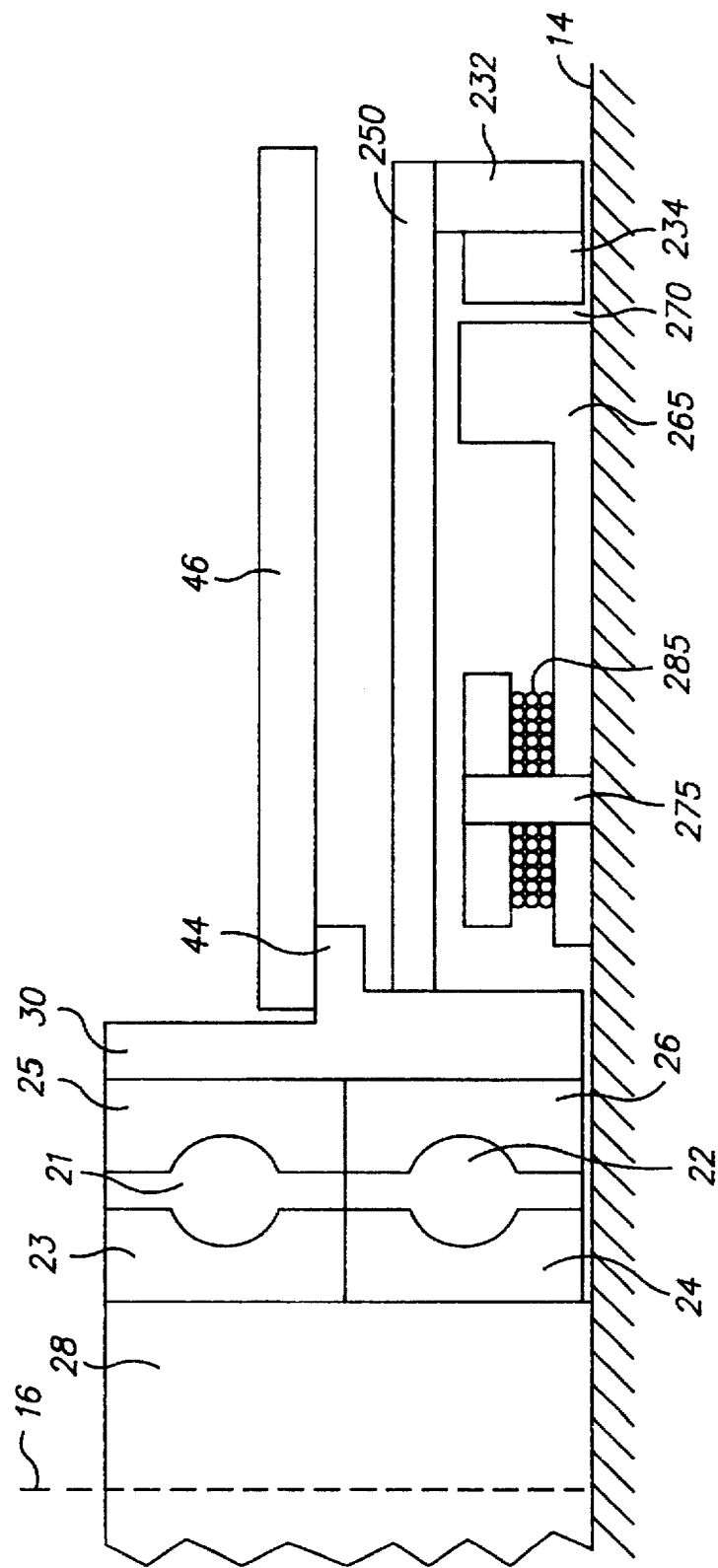
FIG. 5 is a sectional view of a portion of an alternative embodiment of the motor showing the ring magnet located radially outwardly of the stator.

FIG. 5 is a second alternative embodiment of the spindle motor and illustrates the stator teeth being located radially inwardly of the ring magnet. In the embodiment of FIG. 5, an annular support plate 250 is attached to sleeve 230 and extends radially outwardly to support the backing rim 232. The ring magnet 234 is attached to and located radially inwardly of backing rim 232. As shown in FIG. 5, the ring magnet 234 is located radially outwardly of the stator tooth 265 with post 275 and coil 285. The working gap 270 is thus located at a radial dimension greater than that in the embodiment shown in FIGS. 1 and 2. The embodiment of FIG. 5 has the advantage that the air gap 270 is located at a larger radius and hence will produce more torque per magnetic flux unit.

Figure 6:
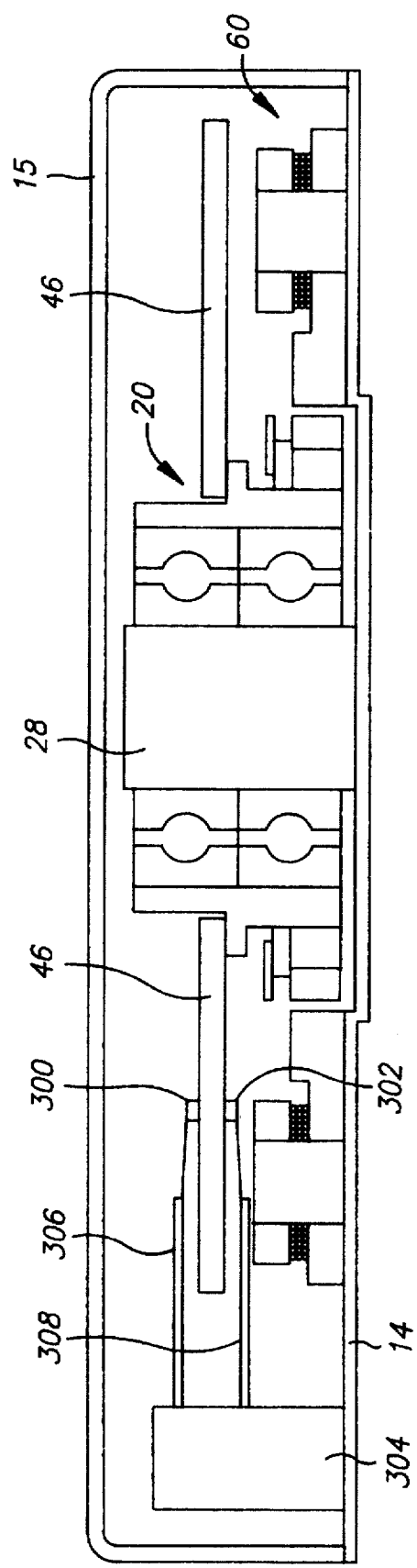
FIG. 6 is a sectional view of a disk drive with spindle motor according to the present invention.

FIG. 6 illustrates the spindle motor rotor 20 and stator 60 as used in a data recording disk drive. The motor 10 is supported on the disk drive base plate 14 and is enclosed by disk drive cover 15. As shown in FIG. 6, a pair of magnetic recording heads 300, 302 are attached to a rotary actuator by means of respective head-arm assemblies 306, 308. The rotary actuator 304 is represented schematically in FIG. 6 and is typically a conventional voice coil motor actuator that rotates the head-arm assemblies 306, 308 to position the respective heads 300, 302 to the appropriate data tracks on opposite sides of magnetic recording disk 46. While the spindle motor and disk drive of FIG. 6 have been illustrated with respect to a magnetic recording disk drive, it is to be understood that the spindle motor is fully applicable for use with other types of data disk drives, such as floppy disk drives or optical disk drives, such as compact disk or magneto-optical disk drives. In the case of optical disk drives, the read or write head is typically an optical head that includes a lens assembly for directing a laser to the appropriate data tracks on the optical disk.

While the preferred embodiments of the present invention have been illustrated in detail, it should be apparent that modifications and improvements may be made to the invention without departing from the spirit and scope of the invention as described in the following claims.

What is claimed is:

1. A brushless direct current motor comprising:

a base;

a rotor attached to the base and rotatable about a rotational axis;

a magnet attached to the rotor for generating magnetic fields in a radial direction generally perpendicular to the rotational axis;

a plurality of stator teeth attached to and located on top of the base and circumferentially spaced around the rotational axis radially outwardly from the magnet, each stator tooth having a radially inner portion with a face radially spaced from the magnet to define a radial gap and a radially outer portion with an axial thickness less than the axial thickness of the face on the inner portion;

a like plurality of conductive coils, each coil being attached to and located on top of a corresponding stator tooth's radially outer portion and generating a magnetic field in an axial direction generally parallel to said rotational axis when conducting electrical current; and a ring flux guide of magnetically permeable material located above the coils and interconnecting the radially outer portions of the stator teeth in a generally circumferential direction; whereby magnetic flux from the magnet across the radial gap to the face on the inner portion of a first one of said stator teeth is directed radially from the inner to the outer portion of said first stator tooth, axially through the coil on the outer portion of said first stator tooth, circumferentially by the ring flux guide to the coil on the outer portion of a second one of said stator teeth circumferentially adjacent said first stator tooth, axially through the coil on the outer portion of said second stator tooth, radially from the outer to the inner portion of said second stator tooth, and radially from the face on the inner portion of said second stator tooth across the radial gap to the magnet.

2. The motor according to claim 1 wherein the ring flux guide has a like plurality of axially directed holes and further comprising a like plurality of magnetically permeable posts, each post being attached to and extending axially from a corresponding stator tooth, wherein each of the coils is wound around a corresponding post and wherein each post is inserted through a corresponding hole of the ring flux guide for mechanical connection of the ring flux guide to the posts.

3. The motor according to claim 1 wherein each of the coils is a flat wound coil.

4. The motor according to claim 1 wherein the axial thickness of the radially outer portion of each of the stator teeth and its attached coil is less than the axial thickness of the magnet near the radial gap.

5. The motor according to claim 1 further comprising a bearing assembly having inner and outer races and fixed to and axially extending from the base, wherein the rotor comprises a sleeve mounted on the outer race of the bearing assembly and a magnetically permeable backing rim attached to the sleeve, and wherein the magnet is a magnetically segmented ring magnet attached to the backing rim; whereby the backing rim provides a magnetic flux path between adjacent magnet segments.

6. A data disk drive motor assembly comprising:

the motor according to claim 1; and a data disk mounted to the rotor of the motor.

7. A data recording disk drive comprising:

a base;

a spindle motor attached to the base comprising:

a bearing assembly having inner and outer races and fixed to and extending axially from the base;

a generally cylindrical sleeve mounted on the outer race of the bearing assembly and rotatable about a central rotational axis;

an annular magnetically permeable backing rim attached to and located radially outwardly of the sleeve;

a magnetically segmented ring magnet attached to and located radially outwardly of the backing rim for generating magnetic fields in a generally radial direction;

a plurality of stator teeth attached to and circumferentially spaced on top of the base around said rotational axis, each stator tooth having a radially inner portion with a face radially spaced from the radially outer surface of the ring magnet to define a radial gap and a radially outer portion with an axial thickness less than the axial thickness of the face on the radially inner portion;

a like plurality of conductive coils, each coil being attached to and located on top of a corresponding stator tooth's radially outer portion and generating a magnetic field in an axial direction generally parallel to said rotational axis when conducting electrical current, the axial thickness of the radially outer portion of each of the stator teeth and its attached coil being less than the axial thickness of the ring magnet near the radial gap; and a ring flux guide of magnetically permeable material located above the coils and mechanically interconnecting the radially outer portions of the stator teeth in a generally circumferential direction; whereby magnetic flux from the ring magnet across the radial gap to the face on the inner portion of a first one of said stator teeth is directed radially from the inner to the outer portion of said first stator tooth, axially through the coil on the outer portion of said first stator tooth, circumferentially by the ring flux guide to the coil on the outer portion of a second one of said stator teeth circumferentially adjacent said first stator tooth, axially through the coil on the outer portion of said second stator tooth, radially from the outer to the inner portion of said second stator tooth, across the radial gap to the ring magnet, and through the ring magnet to the backing rim;

a data disk having data tracks and attached to the sleeve of the spindle motor;

a data read or write head for reading data from or writing data to the data tracks on the disk; and an actuator attached to the base and supporting the head for positioning the head to the data tracks on the disk.

8. The disk drive according to claim 7 wherein the ring flux guide has a like plurality of axially directed holes and further comprising a like plurality of magnetically permeable posts, each post being attached to and extending axially from a corresponding stator tooth, wherein each of the coils is wound around a corresponding post and wherein each post is inserted through a corresponding hole of the ring flux guide for mechanical connection of the ring flux guide to the posts.

9. The disk drive according to claim 7 wherein each of the coils is a flat wound coil.

* * * * *